United States Patent [19]
O'Connell

[11] Patent Number: 6,006,340
[45] Date of Patent: Dec. 21, 1999

[54] COMMUNICATION INTERFACE BETWEEN TWO FINITE STATE MACHINES OPERATING AT DIFFERENT CLOCK DOMAINS

[75] Inventor: Thomas Wayne O'Connell, San Jose, Calif.

[73] Assignee: Phoenix Technologies Ltd., San Jose, Calif.

[21] Appl. No.: 09/049,967

[22] Filed: Mar. 27, 1998

[51] Int. Cl.⁶ ..................................................... G06F 13/38
[52] U.S. Cl. .......................................... 713/600; 709/233
[58] Field of Search .................................. 713/400, 600; 709/232, 233, 235; 710/52–57, 60

[56] References Cited

U.S. PATENT DOCUMENTS

| | | | |
|---|---|---|---|
| 4,463,443 | 7/1984 | Frankel et al. ............................. | 710/60 |
| 5,237,660 | 8/1993 | Weber et al. .............................. | 710/57 |
| 5,712,992 | 1/1998 | Hawkins et al. .......................... | 710/57 |
| 5,717,954 | 2/1998 | Grieff et al. .............................. | 710/57 |

*Primary Examiner*—Thomas M. Heckler
*Attorney, Agent, or Firm*—Foley & Lardner

[57] ABSTRACT

A system for creating a communication interface between a first finite state machine, operating in accordance with a write side clock in a write side clock domain, the first finite state machine operating to generate a Request signal for a transaction and for requesting the transfer of information associated with the Request signal, and a second finite state machine, operating in accordance with a read side clock in a read side clock domain at a different frequency than the write side clock, comprising: a register file; a first interface to the first finite state machine; a second interface to the second finite state machine; and logic for loading in accordance with the write side clock, a communication queue of the information into the register file in accordance with the Request signals from the first finite state machine, for reading by the second finite state machine via the second interface in accordance with the read side clock.

34 Claims, 6 Drawing Sheets

COMMUNICATION INTERFACE BETWEEN TWO FINITE STATE MACHINES OPERATING AT DIFFERENT CLOCK DOMAINS

FIELD OF THE INVENTION

The present invention relates generally to the data communication field, and more particularly, to a system, and method and software for creating an interface between two different clock domains. The invention pertains to any design with an "asynchronous" interface between two different clock domains, where a request acknowledge handshake signal is communicated across this "asynchronous" interface.

BACKGROUND OF THE INVENTION

The present invention has broad applicability to any situation where data is being communicated between two different clock domains. However, the present invention will be described, for convenience, in the context of communication within a computer. For example, the Intel® PCI bus provides a bus connection between one or more master applications, an Intel processor, and main memory. The PCI bus allows for a master "dispatcher" to communicate application-writes to main memory across the PCI bus. The PCI bus permits the master application to drive the address of a subsequent master application operation as soon as the occurrence of the clock immediately following the last data transfer of a master application write request. In order to facilitate such communication, the master "dispatcher" is generally synchronous to the PCI clock so that the PCI finite state machine is able to load the address of a new master request in the cycle immediately following a previous write data cycle. In a modular PCI bus design, the PCI finite state machine and the PCI bus driver logic must be tied to an industry standard 33 or the 66 MHz PCI clock. This clock frequency is referred to as the read side clock for the read side domain. However, it is very desirable to have the master dispatcher or master cycle requester not be required to run at the same clock frequency as the PCI bus read side clock. Specifically, it is very undesirable to place a particular frequency constraint on the clocks running the various applications on the write side domain. It is preferred that the various applications on the write side be able to operate at their maximum clock speeds. Examples of write side domain applications which should be permitted to operate at their preferred maximum clock speed are ethernet controllers, graphics controllers, and disk controllers.

Additionally, because getting on and off the PCI bus in order to facilitate a data transfer is very time consuming, it is desired that any data transfer be as efficient as possible. This is a particular problem for data transferred from a write side clock domain to a read side clock domain (the PCI bus), because the handshake acknowledge signals must be communicated back and forth between these two clock domains.

SUMMARY OF THE INVENTION

Briefly, the present invention comprises, in one aspect, a system for creating a communication interface between a first finite state machine, operating in accordance with a write side clock in a write side clock domain, the first finite state machine operating to generate a Request signal for a transaction and for requesting the transfer of information associated with the Request signal, and a second finite state machine operating in accordance with a read side clock in a read side clock domain at a different frequency than the write side clock. The system comprises a register file, a first interface to the first finite state machine; a second interface to the second finite state machine; and logic for loading in accordance with the write side clock, a communication queue of the information into the register file in accordance with the Request signals from the first finite state machine, for reading by the second finite state machine via the second interface in accordance with the read side clock.

In a further aspect of the present invention, the second finite state machine generates a Transaction Complete signal when the transaction associated with one of the Request signals has been completed by the second finite state machine; and the logic for loading comprises a first handshake logic which operates to generate a first handshake signal to the first finite state machine to authorize loading the register file, until the register file is filled to a threshold capacity, without reference to the Transaction Complete signal; and a second handshake logic which operates to provide a second handshake signal to the first finite state machine upon reception of the Transaction Complete signal.

In a further aspect of the present invention, an article of manufacture is provided having computer readable code means embodied therein for controlling a chip design computer to design a circuit in accordance with the present invention on a chip to create a communications interface between two finite state machines operating in different clock domains.

In a yet further aspect of the present invention, a method is disclosed in accordance with the invention for creating a communications interface between two finite state machines operating in different clock domains.

Various additionally important aspects of the invention are defined in the claims.

DETAILED DESCRIPTION OF THE PREFERRED EMBODIMENTS

It has been recognized in the present invention that a fundamental constraint on improving the efficiency of transactions from one clock domain to a second clock domain is in the handshake protocol that is utilized to let the read side know that the write side has requested a transaction with the read side, and to let the write side know when that transaction has actually been completed. The present invention, in its broader aspect, generates a communication queue of information for reading by the read side clock domain, independent of prior art handshake protocols.

Note that the write side clock domain refers not to whether an overall write task is to be performed, but rather to the fact that that first finite state machine is writing transaction parameters (Address, Word Count, for example) to the register file 10. Likewise, the read side clock domain does not refer to whether an overall read task is to be performed, but rather to the fact that the transaction parameters are being read from the register file 10.

The invention provides a communication interface between two finite state machines operating in different clock domains to allow the performance of any task.

Figure 1:
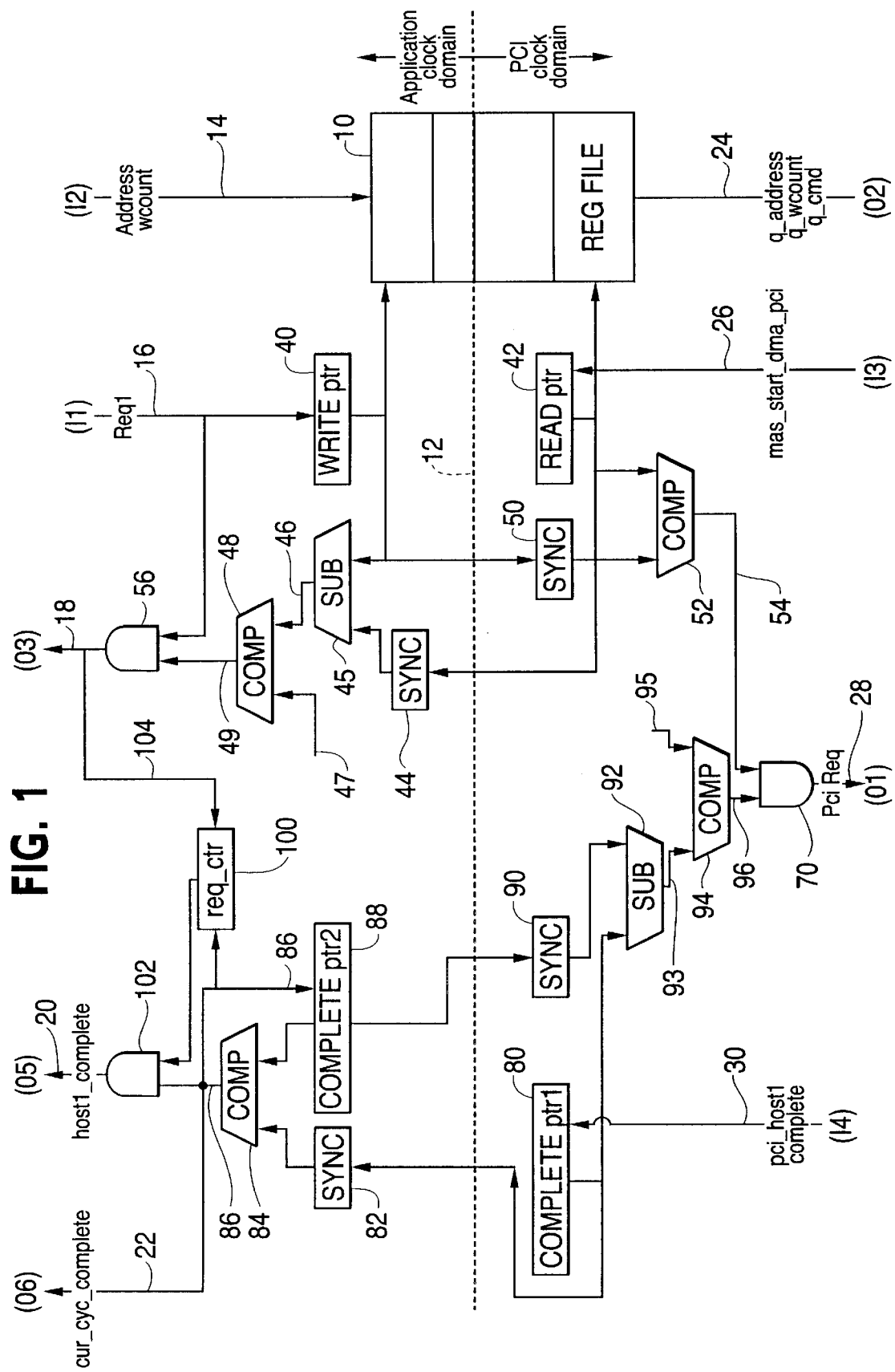
FIG. 1 is a schematic block diagram of a preferred embodiment of the present invention.

Referring now to FIG. 1, there is shown a register file 10, for providing an asynchronous transfer of information for a transaction from a write side clock domain, operated in accordance with a write side clock, to a read side clock domain operated in accordance with a read side clock for a PCI interface. It is to be appreciated that other clock domains are contemplated by the present invention, with the PCI interface used as an example. The information to be transferred typically comprises one or more parameters for a transaction between two or more finite state machines. Typical parameters would include Address, and Word Count.

In the logic shown in FIG. 1, the top portion of the logic above a dashed line 12 is operated in accordance with the write side clock. In contrast, the bottom portion of the logic below the dashed line 12 is operated in accordance with the read side clock. In the diagram, the inputs are numbered I1–I4 and the outputs are labeled 01–03, 05 and 06. It should be noted that in the present design, the write side domain, i.e., the application side, can be operated on any clock frequency. In contrast, the read side clock domain, i.e., the PCI side, in the example must comply with the industry standard PCI clock frequencies of 33 and 66 MHz. The waveform shown in FIGS. 2–6 are identified with the same numbers I1–I5 and 01–03, - 05 & 06.

Although a variety of different register files may be utilized to implement the register file 10, it is preferred that a first-in-first-out (FIFO) register be utilized.

The present system is designed to transfer information parameters for a transaction from a write side clock domain to a read side clock domain in accordance with a Request signal. A piece of information is associated with each Request signal. Typically this information would comprise addressing and other transfer parameters such as, for example, Address, Word Count, Command, expanded address flag, and QNEXT. In the embodiment in FIG. 1, an application in the write side domain issues a Request signal I1 on line 16 along with the information parameter that it wishes to communicate to the read side clock domain on line 14 (I2) for a transaction. In the example used to illustrate the present invention, the signal (I2) on line 14 comprises Address and Word Count parameters.

In its broadest aspect, the present invention comprises a register file 10, an interface to a first finite state machine operating in accordance with a write side clock in the write side clock domain, with the first finite state machine operating to generate a Request signal for a transaction and for requesting the transfer of information associated with the Request signal. The present invention further includes an interface to a second finite state machine, operating in accordance with a read side clock in the read side clock domain at a different frequency than the write side clock, and logic for loading in accordance with the write side clock a communication queue of the information into the register file in accordance with the Request signals from the first finite state machine, for reading by the second finite state machine in accordance with the read side clock. In the embodiment shown in FIG. 1, the interface to the first finite state machine comprises the lines 14, 16, 18, 20, and 22. The interface to the second finite state machine comprises the lines 24, 26, 28, and 30.

In a further aspect of the invention, the second finite state machine generates a Transaction Complete signal (I4) when the transaction associated with one of the Request signals has been completed by the second finite state machine, and the logic for loading comprises a first handshake logic which operates to generate a first handshake signal (03) to the first finite state machine to authorize loading of the register file until the register file is filled to a threshold capacity, without reference to the Transaction Complete signal (I4). This embodiment further includes a second handshake logic which operates to provide a second handshake signal (06) to the first finite state machine upon reception of the Transaction Complete signal.

In one embodiment of the invention, the first handshake logic comprises a write pointer 40 which is incremented upon the receipt of a Request signal (I1) on line 16 from the write side clock domain in accordance with the write side clock. This write pointer 40 determines which location in the register file 10 in which to store the received information on line 14 (I2). Note that the write pointer 40 may be set to rollover at the maximum index of the register file 10. For example, if the register file index is 4, then the rollover would occur at 3 (i.e., 0,1,2,3,0,1,2,3, etc.).

The first handshake logic further includes a read pointer 42, incremented by a mas_dma_start signal (03) on line 26 in accordance with the read side clock, to determine from which location in the register file 10 to read information. The first handshake logic may include a first logic for determining if the register file 10 is at a threshold capacity based on outputs from the write pointer 40 and the read pointer 42, and preventing further loading of information to the register file 10, if the register file 10 is determined to be at its threshold capacity.

In a preferred embodiment, the first logic may comprise a first synchronizer 44 for resynchronizing an output from the read pointer 42 in accordance with the write side clock. The first logic further includes a difference circuit 45 for determining a difference between the resynchronized output from read pointer 42 and a write pointer output from the write pointer 40. Finally, the first logic may include a comparison circuit 48 for generating a signal to prevent loading of information in the register file 10 if the difference between the output on line 46 has a predetermined value compared to a threshold value provided on line 47. This synchronized difference on line 46 is compared in the comparator 48 to a hard coded threshold value on line 47, which is a function of the depth of the register file 10, and how quickly the application will respond to the negation of the mas_dma_start signal on line 18. For example, if the threshold value on line 47 is set equal to 3 to provide flow control for a register file with an index of 3, then the comparator 48 will go LOW on its output line 49 when the difference signal on line 46 exceeds the threshold of 3 set by line 47.

The signal from the comparison circuit 48 on line 49 is applied as one input to an AND gate 56, which is designed to provide the aforementioned first handshake signal (03) to the first finite state machine. The second input to the AND gate 56 is simply the Request signal from line 16. The signal on line 49 from the comparator 48 is always HIGH unless the difference signal on line 46 from the difference circuit 45 has a predetermined value (exceeds in this example embodiment) compared to the threshold level set on line 47.

The output from the AND gate 56 is applied on line 18 as the mas_dma_start signal (O3), the first handshake signal, to the first finite state machine. In essence, this signal on line 18 provides a shortcut first handshake signal to allow a queue of input information I2 for a transaction to be loaded via the line 14 into the register file 10. The Request signal I1 on line 16 is used to provide an automatic first handshake signal (O3) on line 18 back to the first finite state machine, unless the output from the comparator 48 goes LOW because the difference signal on line 46 exceeds the threshold capacity level on line 47. In essence, the Request signal is used as a write request to an asynchronous fifo, and the effective parameter acknowledge handshake received is just the write pulse returned through a single gate to the write side clock domain.

Mas_dma_start (O3) is a signal issued to indicate to the first finite state machine that the Request parameter I2 was accepted in the read side clock domain and that the parameters are stored, and to allow the first finite state machine to immediately issue another Request signal.

Since the operation of a typical PCI machine is not only at a different clock speed, but tied to an unpredictable PCI bus, the queue circuit must be able to "flow control" the application, which would otherwise be loading a new Request every time it sees a mas_dma_start (O3) signal. This flow control is accomplished with the foregoing logic.

In a preferred embodiment, the first handshake logic may further comprise a second logic operating in accordance with the read side clock domain for reading the register file 10 at a location pointed to by the read pointer 42 if an output from write pointer 40 is indicative that there is information to be read in the register file 10. In one embodiment, the second logic comprises a second synchronizer 50 for resynchronizing the output from the write pointer 40 to the read side clock domain, and a comparator 52 in the read side clock domain for comparing the resynchronized output from the write pointer 40 to the output from the read pointer 42 and generating a fifo valid signal on line 54 to cause the register file to be read if there is a difference in the pointer values.

There are a variety of methods available for implementing the synchronization blocks in the design. Many of these methods involve using gray codes. The synchronization can be performed by an industry standard double de-meta stabilizing flip flop pair. In essence, the signal is clocked into a register with the destination domain clock, and then the output of this first stage clocking goes into a second register also clocked with the destination domain clock.

The availability of the Request signal and the desire to transfer information from the write side clock domain to the read side clock domain becomes visible in the read side clock domain by the "fifo valid" signal on the line 54. As noted earlier, the comparator 52 compares the output from the read pointer 42 to the output from the write pointer 40, which has been resynchronized to the read side clock domain. The "fifo valid" signal on line 54 becomes a "Request Pending" signal on line 28 after it is gated through an AND gate 70. Line 28 interfaces to the second finite state machine. The second finite state machine (the PCI machine) in this example responds to the Request Pending signal on line 28 by reading the information from the register file 10 from the file pointed to by the register pointer 42 and loads that information, i.e., "pops" the fifo. The second finite state machine then indicates acceptance of this piece of information by generating a signal mas_start_dma_pci, the signal I3, on line 26. This signal I3 indicates that all information parameters necessary to complete the transaction, i.e., for a read or write transaction that would include an address in main memory, number of words, whether to read or write, etc., has been received, and the transfer can start (i.e. acceptance).

This acceptance signal (I3), mas_start_dma_pci on line 26, increments the read pointer 42 in accordance with the read side clock to the next location in the register file 10 to be read, if the write side had written multiple requests and queued them in the register file 10 as previously discussed. The output value from the read pointer 42 will be again compared with the output value of the write pointer 40 that has been resynchronized by the synchronization block 50. If there is a difference in the values held in these two pointers, then the signal on line 54 indicates that a new piece of information in the register file 10 is ready to be read.

From the above, it can be seen that the first finite state machine in the write side clock domain does not need to wait for the transaction to complete, i.e., for the actual transfer of data on the PCI Bus, which will then generate a Transaction Complete signal (I4). Rather, a continuous queue of information can be formed in the register file 10 and read from that register, within limits to be described below.

The first finite state machine typically will also need to know not only when a given piece of information associated with a Request signal has been accepted and that the information has been read, i.e., popped from the fifo, but also when the current request cycle (transaction) is completed in the second finite state machine, i.e., the PCI bus. When the second finite state machine has completed the transaction associated with the Request signal, then it generates a Transaction Complete signal I4 on line 30. This monitoring function is accomplished by a third logic to monitor a number of Transaction Complete signals received in the write side clock domain, to compare that number in the read side clock domain to a number of Transaction Complete signals generated in the read side clock domain and to determine a difference; and then to prevent the register file from being read if the determined difference has a predetermined value as compared to a second threshold value. In essence, the design of FIG. 1 includes a parallel dataless fifo pointer mechanism including a first completion pointer 80, a synchronizer block 82, a comparator 84, a second completion pointer 88, a synchronizer 90, a subtractor block 92, a comparator block 94, and an output line 96 to the AND gate 70, which generates the Request Pending signal (O1) on line 28.

The purpose of this logic is as follows. There may be applications where the write side clock is much slower than the read side clock so that multiple Request signals on line 16 could have been read by the second finite state machine and multiple Transaction Complete signals generated on line 30. These multiple Transaction Complete signals on line 30 could be enough to overflow the first completion pointer 80, so that it would appear that either no Transaction Complete signals had been received or that only one or two Transaction Complete signals had been received. In this situation, it is important to prevent the first finite state machine from loading more information into the register file 10 until the first finite state machine has caught up with its reception of Transaction Complete signals in the write side clock domain. To accomplish this, logic is set up to stop further information reads from register file 10 by the second finite state machine until the first finite state machine has caught up with its reception of Transaction Complete signals in the write side clock domain. In essence, this logic is designed to act as a throttle on the information transfer interface.

It should be noted that in the cycle Transaction Complete handshake queue, there may or may not be parameters sent back to the first finite state machine in the write side clock domain. If there are no parameters that are required to be sent back into the write side clock domain, then the write side clock domain requires only to know when the transaction is complete. Thus, there is no need for data registers in the Transaction Complete handshake queue, just a set of fifo completion pointers for flow control.

Referring to the operation of this third logic, the first completion pointer 80, operating in the read side clock domain and having a second threshold capacity, receives Transaction Complete signals (I4) from the second finite state machine on line 30. The signal I4 on line 30 increments the completion pointer 80. The output from the completion pointer 80 is resynchronized by a synchronization block 82 to the write side clock. This resynchronized value from the first completion pointer 80 is then compared in a comparator 84 to a value or output from the second completion pointer 88. When the values in the first and second completion pointers 80 and 88 differ, a single application clocked pulse is provided as an output on line 86. This signal on line 86 is listed as signal 06 in FIGS. 2–6. The signal on line 86 is applied as an input to increment the second completion pointer 88. The incrementing of the second completion pointer 88 assures that the comparator 84 will output exactly one pulse each time the first completion pointer 80 is incremented and that signal has been resynchronized into the write side clock domain. In this way, a single Transaction Complete signal is translated into exactly one application clock cycle.

The output from the second completion pointer 88 is sent back into the read side clock domain and resynchronized in a synchronizer block 90 to the read side clock. The resynchronized output from the second completion pointer 88 is then applied to one input of a subtractor block 92. The other input to the subtractor block 92 is the output from the first completion pointer 80. The subtractor block 92 determines a difference value in the read side clock domain between the output of the first completion pointer 80 and the resynchronized output from the second completion pointer 88. This difference signal is then applied on line 93 as one input to the comparator 94. A second input on line 95 to the comparator 94 is the second threshold value, which represents the threshold capacity of the first completion pointer 80. Normally, the output from the comparator 94 is HIGH on line 96. Thus, the AND gate 70 simply operates to convert the fifo valid signals on line 54 into Request Pending signals (01) on line 28 to the second finite state machine. However, when the difference signal on line 93 between the first and second completion pointers has a predetermined value compared to the second threshold value on line 95 (for example, exceeds that value), then the signal on line 96 drops to a LOW, thereby causing the signal on line 28 from the gate 70 to go LOW. Accordingly, with the signal on line 28 being LOW, no signal will be generated on line 26 to increment the read pointer 42, thereby preventing the register file 10 from being read.

The present throttle design is frequency independent and allows the use of the present invention even with an extreme difference in frequencies used in the read and write clock domains. The design allows the queue to empty before allowing any more Requests to be read. Thus, the present design is a frequency independent design. It makes no difference which clock domain is faster or slower.

The output from the comparator 84 comprises the second handshake signal and is applied to the first finite state machine on line 22, and is listed as cur_cyc_complete signal (06) in FIG. 1 and in the signal diagrams of FIGS. 2–6. Thus, every Transaction Complete signal I4 will eventually result in a second handshake signal on line 22.

The user may additionally wish to queue up a block of Requests and use a "Block Complete" signal to start a new task on the write side clock domain, i.e., the application side. In order to generate this "Block Complete" signal, a block complete logic is provided for comparing in the write side clock domain the number of Request signals to the number of Transaction Complete signals received in the write side clock domain to obtain a difference, and to generate a Block Complete signal when the difference is zero. This block complete logic is implemented in the embodiment shown in FIG. 1 by an up/down request counter 100 and an AND gate 102. As Request signals are received on line 16 and gated through AND gate 56, the output from the AND gate 56 is applied on line 104 to count up the request counter 100. The signal on line 86, providing an indication of a Transaction Complete signal on line 30, is applied to a second input of the request counter 100 to count down that counter. The output on line 101 of the request counter 100 is applied as one input to an AND gate 102. The second input to the AND gate 102 is the output from the comparator block 84 on line 86. When the signal on line 86 is HIGH, indicating a Transaction Complete signal, and the request counter value is "1" (indicating there is one, and only one, outstanding request), then the output from the AND gate 102 goes HIGH, to generate the "Block Complete" signal (05) on line 20 of FIG. 1. This signal is also shown in the signal diagrams of FIGS. 2–6 as signal (05).

Figure 2:
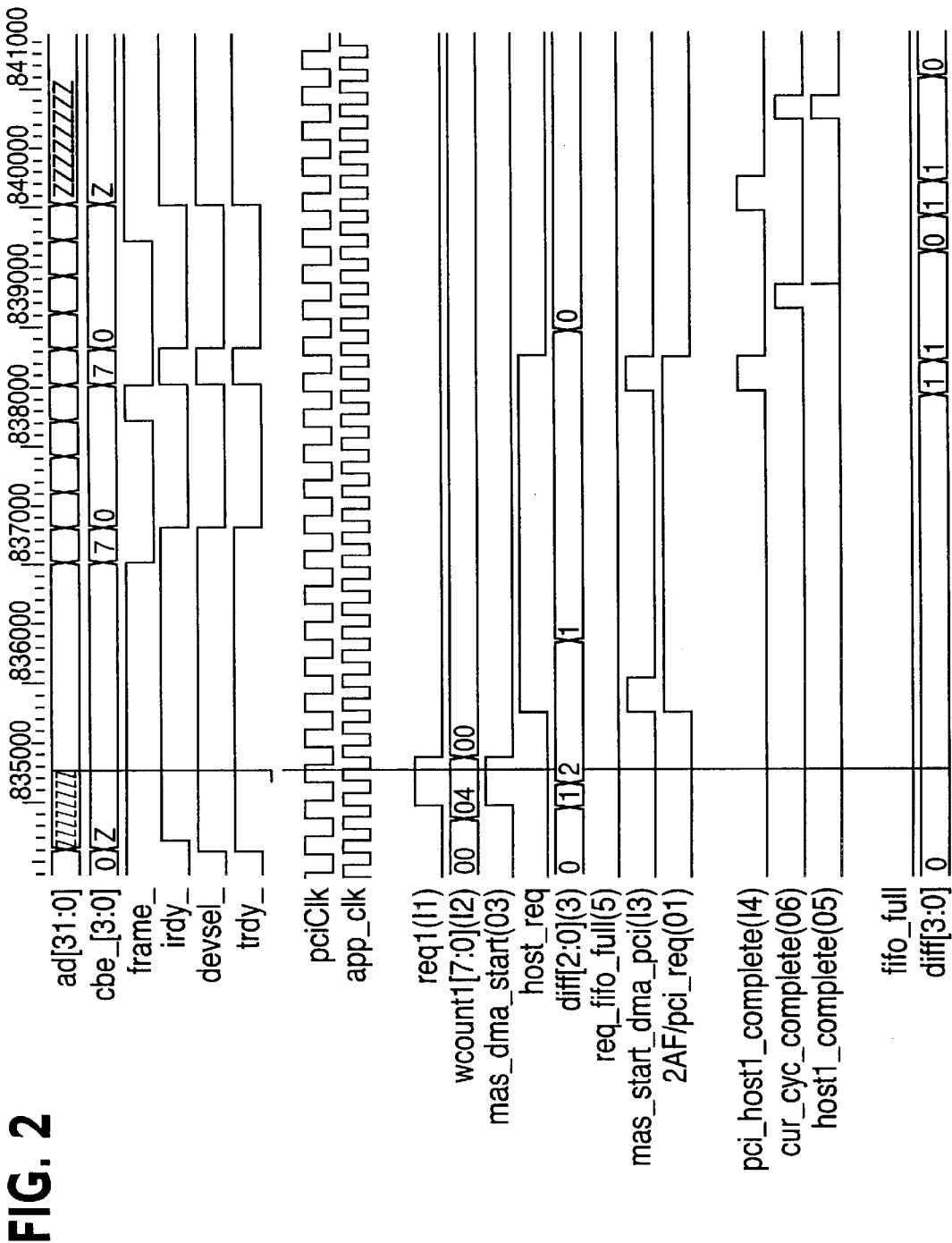
FIG. 2 is a first set of waveform timing diagrams illustrating the operation of FIG. 1 from startup from reset.

Referring to the timing diagram shown in FIG. 2, the read side clock domain (the application) queues up two requests at about 835000, with the Request signal (I1 active for two application clock cycles, and the word count signal (I2) active for four read clock cycles for each Request. A Request Pending (01) signal occurs synchronized to the read side clock at 835800. A first Transaction Complete signal (I4) occurs in this example, at the same time as a mas_start_dma_pci signal (I3) on line 26 at the read side clock at 838500. It is to be noted that a matching of those signals is not required. The first signal on line 22, (06), comprising the second handshake signal, occurs synchronized to the right side clock at 839200. Note that since there is a second Request signal in the queue, the request counter 100 prevents the "Block Complete" signal from being generated on line 20. When the second Transaction Complete signal propagates through the logic and causes another second handshake signal (06) on line 22, at 840800, then the Request counter 100 will cause the AND gate 102 to generate the "Block Complete" signal (05) on line 20 in synchronization with the write side clock.

Accordingly, it can be seen that the read side clock domain (the PCI section) is able to execute gapless back-to-back cycles in the read side clock domain (PCI bus). This is illustrated during the period 837000–840000. Note that this gapless back-to-back cycling has occurred even with the Requests arriving completely asynchronously in the write side clock domain (the application side clock domain) relative to the PCI clock. Also note that the Requests are accepted back-to-back at 835000 in the write side clock domain. The resynchronization is almost invisible to both clock sides. This logic thus allows two sections running at different clock rates to proceed independently with almost no timing penalty. The only penalty is the time for the initial request. Once the communication queue is loaded, the present design will permit the transfer of information as fast as any purely synchronous design, without the obvious penalty of requiring the write side domain (the application side) to run at the read side clock speed.

Figure 3:
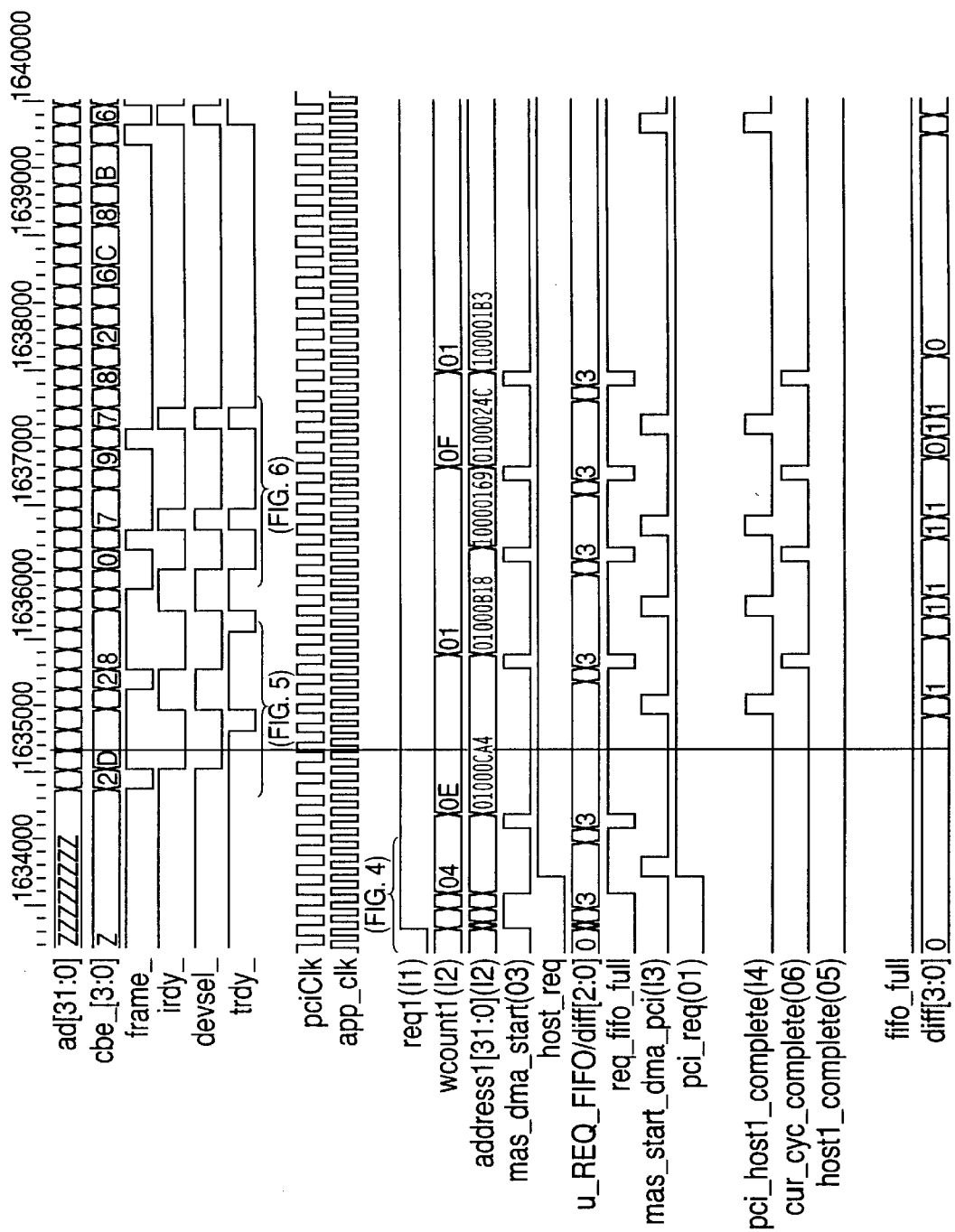
FIG. 3 is a second set of waveform timing diagrams illustrating the operation of the flow control throttling.
Figure 4:
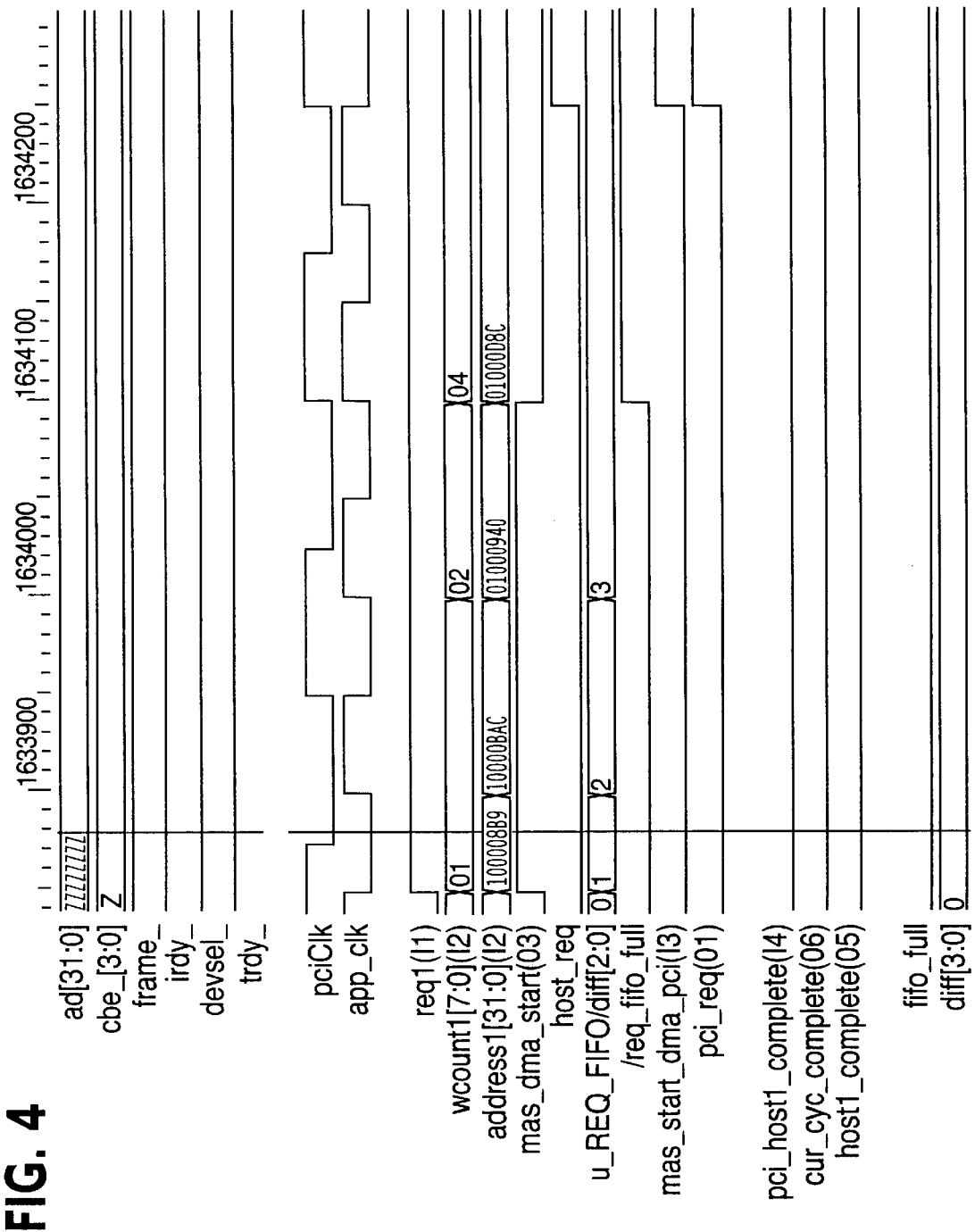
FIG. 4 is a third set of waveform timing diagrams comprising an expanded view of a first portion of the waveforms of FIG. 3.
Figure 5:
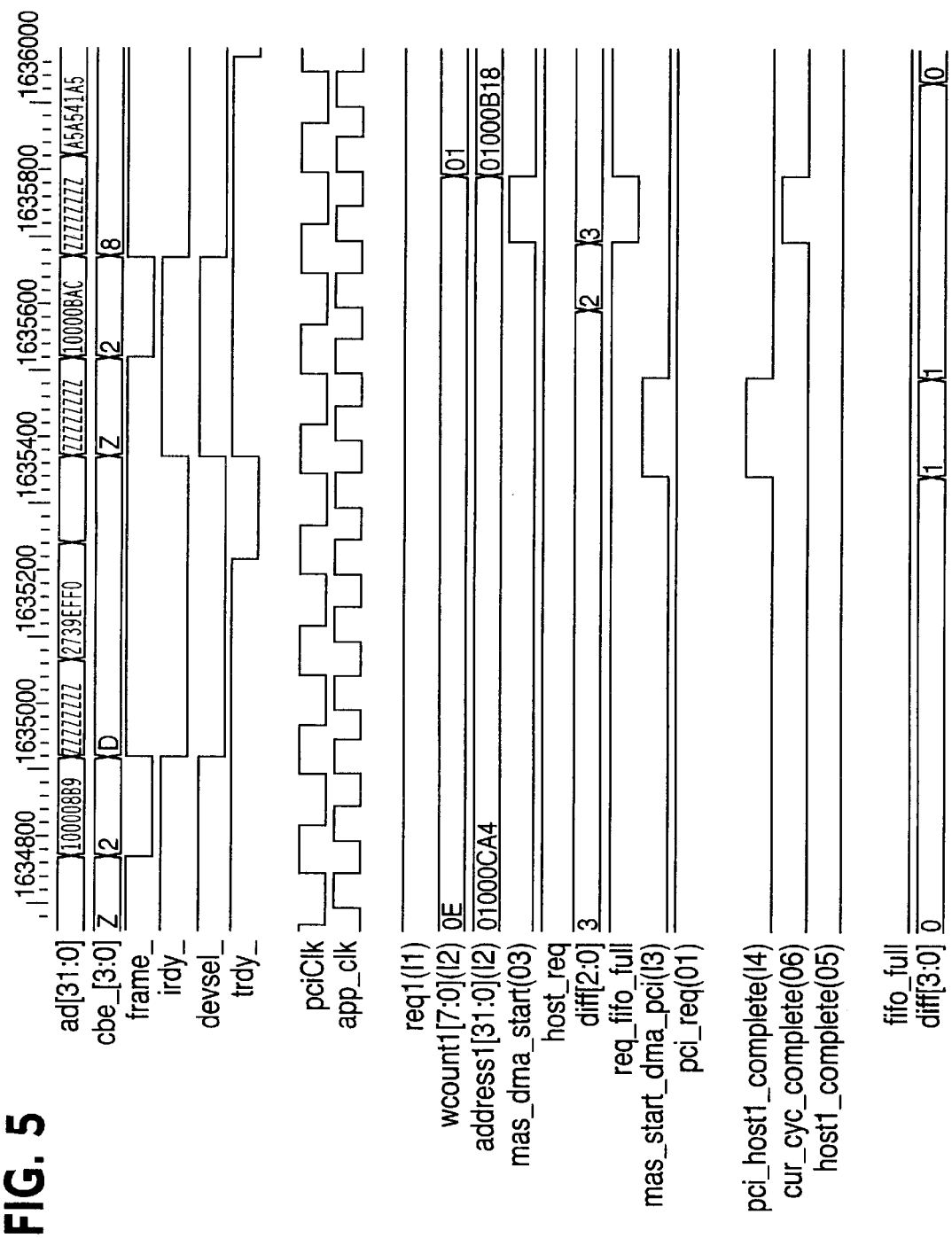
FIG. 5 is a fourth set of waveform timing diagrams comprising an expanded view of a second portion of the waveforms of FIG. 3.

Referring now to FIG. 3, the full control feedback is shown "throttling" or holding off the information transfer. At 1633800, the write side domain queues more Requests than the register file 10 can store. By way of example, the current implementation shows a four deep queue. After accepting the first three Requests and storing the information associated with each request at a different register in the register file 10, the output from the subtractor block 45 exceeds the threshold in the comparator 48. Accordingly, the output signal on line 49 from the comparator block 48 goes LOW, thereby causing the output of the AND gate 56 to go LOW on line 18. Accordingly, the mas_dma_start signal 03 on line 18 is LOW and no further Request signals are gated to create the first handshake signal until the signal on line 18 (03) goes HIGH. It should be noted that the write side domain first finite state machine may leave active the Request signal (I1), but the first finite state machine must not change to a new address parameter I2, until one of the registers in the register file 10 has been read out on line 24. The reading out of information from one of the registers in the register file 10 will cause the mas_start_dma_pci (I3) signal to increment the read pointer 42. The output from the read pointer 42 is then resynchronized in the synchronizer block 44 and applied to the subtractor block 45 to change the difference output on line 46 to indicate that there is room in the register file for the information for one more Request. This operation allows a new Request signal to cause the mas_dma_start signal (03) to go HIGH, implementing the first handshake signal. From 1633800 to 1634100 other Request signals are accepted. At 1634100 the mas_dma_start signal (03) stops until later at 1634600, there is room for one more request.

Figure 6:
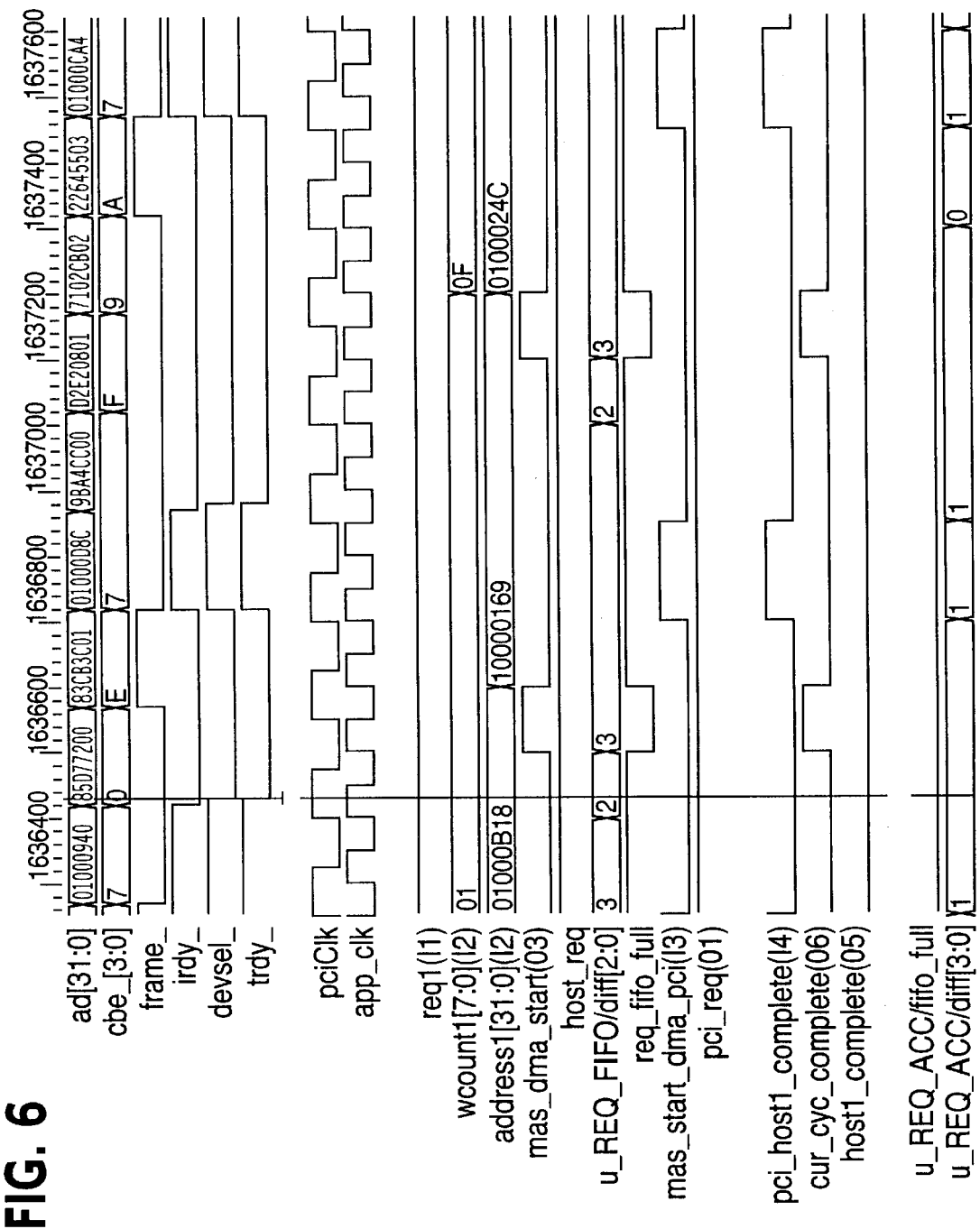
FIG. 6 is a fifth set of waveform timing diagrams comprising an expanded view of a third portion of the waveforms of FIG. 3.

On the read side, the first Request is available through the request fifo (signal 01) at 1634200, and the first pci bus cycle occurs at 1634900 (see the frame signal in FIG. 5), followed by back-to-back pci bus cycles. In the expanded diagram of FIG. 4 the queued pci addresses can be seen on signal waveform I2, and in the expanded waveform diagrams of FIG. 5 and FIG. 6 these same addresses appear on the PCI bus. Note that only write cycles are allowed to be followed by a "zero latency" pci cycle, per the specification. This is why in the timing diagram of FIG. 5 the last data cycle of the I/O read (cbe=2 starting at 1634880), is followed by one single "dead" cycle on the pci bus (frame, trdy, irdy are all inactive at value HIGH). In FIG. 6 can be seen three consecutive writes [cbe=7], with the first write cycle starting at 1636380) with no dead cycle between them.

What has been accomplished by this queue mechanism is zero cycle delays for Requests on the write (application) side and zero cycle latency on the pci read side of the queue.

The present invention permits the application, or write side, to run at any speed relative to the read side clock, thereby allowing the evolution of the back end to proceed independently from the read side clock domain (PCI Interface logic). The final frequency that the write side clock domain (the application logic) uses can be tuned to a process dependent frequency with the present invention.

The present invention eliminates timing limitations in transactions between two different clock domains, while allowing maximum efficiency by allowing the requesting write side domain to field back-to-back zero clock delay master requests.

It should be noted that the present inventive design may be implemented on a semiconductor chip utilizing EDA (Electronic Design Automation) tools such as HDL programming code designed to control a chip design computer. By way of example, a standard HDL code is Verilog code. This Verilog code is a high level code which would be run through a program to translate that code into code directly readable by chipmaking machines. A typical program for translating the Verilog code is a program called Synopsys™.

Accordingly, the present invention can be implemented in computer code form (i.e. as a core) created to cause a chip design computer to create the logic of the present invention on an integrated circuit.

Additionally, it should be noted that the present logic may be implemented by means of a computer program controlling a computer to emulate a hard wired logic design.

The present invention has broad applicability to any transaction between a first and a second finite state machines. Although the example embodiment used to describe the invention was set in the context of a read transaction from main memory, the invention can be used for any type of transaction. The invention can be thought of as facilitating a link list page table.

For a "write" transaction, the first finite state machine could extract data from one or more buffers in the write side domain, and then write to one or more second finite state machines in the read side domain using queued Request signals on line 16 (I1) and associated parameter data (Address, Word Count) queued in the register File 10 via line 14 (I2). For example, the first finite state machine in the write side domain could write a first set of words (specified by the Word Count parameter,) to a first address (specified by the Address parameter), with both information parameters queued in respective register files 10, in accordance with a First Request signal (I1). This would be followed by a second set of words (specified by the Word count parameter) written in accordance with a second Request signal to a second address (specified by the Address parameter), both parameters queued in the respective register files 10. This writing operation to one or more second finite state machines in the write domain would continue until all of the Requests were completed.

Note that the write side clock domain refers not to whether an overall write task is to be performed, but rather to the fact that that first finite state machine is writing transaction parameters (Address, Word Count, for example) to the register file 10. Likewise, the read side clock domain does not refer to whether an overall read task is being performed, but rather to the fact that the transaction parameters are being read from the register file 10.

The invention provides a communication interface between two finite state machines operating in different clock domains for the performance of any task.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system for creating a communication interface between a first finite state machine, operating in accordance with a write side clock domain, said first finite state machine operating to generate a Request signal for a transaction and for requesting the transfer of information associated with said Request signal, and a second finite state machine, operating in accordance with a read side clock in a read side clock domain at a different frequency than said write side clock, comprising:

a register file;
   a first interface to said first finite state machine;
   a second interface to said second finite state machine; and
   logic for loading in accordance with said write side clock, a communication queue of said information into said register file in accordance with said Request signals from said first finite state machine, for reading by said second finite state machine via said second interface in accordance with said read side clock;
   wherein said second finite state machine generates a Transaction Complete signal when said transaction associated with one of said Request signals has been completed by said second finite state machine; and
   wherein the logic for loading comprises:
      a first handshake logic which operates to generate a first handshake signal to said first finite state machine to authorize loading said register file, until said register file is filled to a threshold capacity, without reference to said Transaction Complete signal; and
      a second handshake logic which operates to provide a second handshake signal to said first finite state machine upon reception of said Transaction Complete signal.

2. A system as defined in claim 1, wherein said register file is a first-in-first-out register file.

3. A system as defined in claim 1, wherein said read side clock domain includes a bus connected to main memory.

4. A system as defined in claim 1, further comprising a third logic to monitor a number of Transaction Complete signals received in said write side clock domain, to compare that number in the read side clock domain to a number of Transaction Complete signals generated in said read side clock domain to obtain a difference, and preventing the register file from being read if said difference has a predetermined value compared to a second threshold.

5. A system as defined in claim 4, wherein said third logic comprises:
   a first completion pointer in said read side clock domain to receive Transaction Complete signals;
   a third synchronizer for resynchronizing an output from said first completion pointer to said write side clock domain;
   a second completion pointer on said write side clock domain for holding a count of increments of said first completion pointer received from said read side clock domain;
   a fourth synchronizer for resynchronizing an output of said second completion pointer to said read side clock domain;
   a difference logic for obtaining a difference in said read side clock domain between the output of said first completion pointer and the resynchronized output from said second completion pointer; and
   a comparator for comparing said difference to said second threshold value, and if said difference has a predetermined value compared to a second threshold value, generating said signal to prevent said read pointer from being incremented.

6. A system as defined in claim 1, wherein said first handshake logic further comprises a second logic operating in accordance with said read side clock domain for reading said register file at a location pointed to by said read pointer if an output from said write pointer is indicative that there is information to be read in said register file.

7. A system as defined in claim 6, wherein said second logic comprises:
   a second synchronizer for resynchronizing the output from said write pointer to said read side clock domain; and
   a comparator in said read side clock domain for comparing the resynchronized output from said write pointer to the output from said read pointer and generating a signal to cause said register file to be read if there is a difference in values.

8. A system as defined in claim 6, wherein said first logic comprises:
   a first synchronizer for resynchronizing an output from said read pointer in accordance with said write side clock;
   a difference circuit for determining a difference between the resynchronized read pointer output and the write pointer output; and
   a comparison circuit for generating a signal to prevent loading of information in said register file if said difference has a predetermined value compared to said threshold value.

9. A system as defined in claim 1, wherein said first handshake logic generates said first handshake logic signal immediately after receipt of each Request signal until a signal indicating that said register file is filled to said threshold capacity is generated.

10. A system as defined in claim 9, wherein said first handshake logic comprises:
   a write pointer incremented upon receipt of said Request signal in accordance with said write side clock to determine which location in said register file in which to store received information;
   a read pointer incremented by said second finite state machine in accordance with said read side clock to determine from which location in said register file to read information; and
   a first logic for determining if said register file is at said threshold capacity based on outputs from said write pointer and said read pointer and preventing further loading of information to said register file if said register file is determined to be at said threshold capacity.

11. A system as defined in claim 10, wherein said first logic comprises:
   a first synchronizer for resynchronizing an output from said read pointer in accordance with said write side clock;
   a difference circuit for determining a difference between the resynchronized read pointer output and the write pointer output; and
   a comparison circuit for generating a signal to prevent loading of information in said register file if said difference has a predetermined value compared to a threshold value.

12. A system for creating a communication interface between a first finite state machine, operating in accordance with a write side clock domain, said first finite state machine operating to generate a Request signal for a transaction and for requesting the transfer of information associated with said Request signal, and a second finite state machine, operating in accordance with a read side clock in a read side clock domain at a different frequency than said write side clock, comprising:

a register file;

a first interface to said first finite state machine;

a second interface to said second finite state machine; and logic for loading in accordance with said write side clock, a communication queue of said information into said register file in accordance with said Request signals from said first finite state machine, for reading by said second finite state machine via said second interface in accordance with said read side clock;

wherein said second finite state machine generates a Transaction Complete signal when said transaction associated with one of said Request signals has been completed by said second finite state machine; and further including a block complete logic for comparing in the write side clock domain the number of Request signals to the number of Transaction Complete signals received in said write side clock domain to obtain a difference and generating a Block Complete signal when said difference is zero.

13. An article of manufacture, comprising:

a computer usable medium having computer readable code means embodied therein for controlling a chip design computer to design a circuit on a chip for creating a communication interface between a first finite state machine, operating in accordance with a write side clock in a write side clock domain and functional to generate a Request signal for a transaction and for the transfer of information associated with said Request signal, and a second finite state machine operating in accordance with a read side clock in a read side clock domain which is operating at a difference frequency than said write side clock, the computer readable code means in said article of manufacture comprising:

first computer readable code means to cause said chip design computer to design a file register; and second computer readable code means to cause said chip design computer to design a logic for loading into said register file in accordance with said write side clock a communication queue of said information in accordance with said Request signals from said first finite state machine, for reading by said second finite state machine in accordance with said read side clock;

wherein said second finite state machine generates a Transaction Complete signal when said transaction associated with one of said Request signals has been completed by said second finite state machine; and wherein said second computer readable code means further includes third computer readable code means to cause said chip design computer to design a first handshake logic which operates to generate a first handshake signal upon receipt of each of said Request signals to authorize loading of information associated with each of said Request signals into said register file until said register file is filled to a threshold capacity, without reference to said Transaction Complete signal from said second finite state machine; and fourth computer readable code means to cause said chip design computer to design a second handshake logic which operates to provide a Transaction Complete handshake signal to said first finite state machine upon reception of each of said Transaction Complete signals.

14. An article of manufacture as defined in claim 13, further comprising twelfth computer readable code means to cause said chip design computer to design a block complete logic for comparing in the write side clock domain the number of Request signals to the number of Transaction Complete signals received in said write side clock domain to obtain a difference and generating a Block Complete signal when said difference is zero.

15. An article of manufacture, as defined in claim 13, further comprising tenth computer readable code means to cause said chip design computer to design a third logic to monitor a number of Transaction Complete signals received in said write side clock domain, to compare that number in the read side clock domain to a number of Transaction Complete signals generated in said read side clock domain to obtain a difference, and preventing the register file from being read if said difference has a predetermined value compared to a second threshold.

16. An article of manufacture as defined in claim 15, wherein said tenth computer readable code means includes eleventh computer readable code means to cause said chip design computer to design said third logic to include:

a first completion pointer on said read side clock domain to receive Transaction Complete signals;

a third synchronizer for resynchronizing an output from said first completion pointer to said write side clock domain;

a second completion pointer on said write side clock domain for holding a count of increments of said first completion pointer received from said read side clock domain;

a fourth synchronizer for resynchronizing an output of said second completion pointer to said read side clock domain;

a difference logic for obtaining a difference in said read side clock domain between the output of said first completion pointer and the resynchronized output from said second completion pointer; and a comparator for comparing said difference to said second threshold, and if said difference has a predetermined value compared to said second threshold, generating said signal to prevent said read pointer from being incremented.

17. An article of manufacture as defined in claim 13, wherein said third computer readable code means includes fifth computer readable code means to cause said chip design computer to design said first handshake logic to generate a first handshake logic signal immediately after receipt of each Request signal until a signal indicating that said register file is filled to said threshold capacity has been generated.

18. An article of manufacture as defined in claim 17, wherein said third computer readable code means further comprises sixth computer readable code means to cause said chip design computer to design said first handshake logic to include:

a write pointer incremented upon receipt of said Request signal in accordance with said write side clock to determine which location in said register file in which to store said information;

a read pointer incremented by said read side clock to determine from which location in said register file to read information; and a first logic for determining if said register file is at a threshold capacity based on outputs from said write pointer and said read pointer and preventing further loading of information by said register file, if said register file is determined to be at said threshold capacity.

19. An article of manufacture as defined in claim 18, wherein said sixth computer readable code means includes seventh computer readable code means to cause said chip design computer to design said first logic to comprise:
   a first synchronizer for resynchronizing an output from said read pointer in accordance with said write side clock;
   a difference circuit for determining a difference between the resynchronized read pointer output and the write pointer output; and
   a comparison circuit for generating a signal to prevent loading of information in said register file if said difference has a predetermined value compared to said threshold value.

20. An article of manufacture as defined in claim 19, wherein said third computer readable code means includes eighth computer readable code means to cause said chip design computer to design said first handshake logic to comprise a second logic operating in accordance with said read side clock domain for reading said register file at a location pointed to by said read pointer if an output from said write pointer is indicative that there is information to be read in said register file.

21. An article of manufacture as defined in claim 20, wherein said eighth computer readable code means include ninth computer readable code means to cause said chip design computer to design said second logic to comprise:
   a second synchronizer for resynchronizing the output from said write pointer to said read side clock domain; and
   a comparator in said read side clock domain for comparing the resynchronized output from said write pointer to the output from said read pointer and generating a signal to cause said register to be read if there is a difference in values.

22. An article of manufacture as defined in claim 20, further comprising tenth computer readable code means to cause said chip design computer to design a third logic to monitor a number of Transaction Complete signals received in said write side clock domain, to compare that number in the read side clock domain to a number of Transaction Complete signals generated in said read side clock domain to obtain a difference, and preventing the register file from being read if said difference has a predetermined value compared to a second threshold.

23. An article of manufacture as defined in claim 22, wherein said tenth computer readable code means includes eleventh computer readable code means to cause said chip design computer to design said third logic to include:
   a first completion pointer on said read side clock domain, to receive Transaction Complete signals;
   a third synchronizer for resynchronizing an output from said first completion pointer to said write side clock domain;
   a second completion pointer on said write side clock domain for holding a count of increments of said first completion pointer received from said read side clock domain;
   a fourth synchronizer for resynchronizing an output of said second completion pointer to said read side clock domain;
   a difference logic for obtaining a difference in said read side clock domain between the output of said first completion pointer and the resynchronized output from said second completion pointer; and
   a comparator for comparing said difference to said second threshold, and if said difference has a predetermined value compared to said second threshold, generating said signal to prevent said read pointer from being incremented.

24. A method for creating a communication interface between a first finite state machine, operating in accordance with a write side clock in a write side clock domain to generate a Request signal for a transaction and for requesting the transfer of information associated with said Request signal, and a second finite state machine operating in accordance with a read side clock in a read side clock domain which is operating at a different frequency than said write side clock, comprising the steps of:
   receiving said Request signals on said write side domain; and
   storing in a communications queue said information in accordance with said Request signals, for reading by said second finite state machine in accordance with said read side clock; and further comprising the steps of:
   receiving a Transaction Complete signal from said second finite state machine when said second finite state machine has completed said transaction associated with one of said Request signals;
   generating a first handshake signal in response to each received Request signal to thereby authorize said storing of information associated with each of said Request signals in said communication queue without reference to said Transaction Complete signals, until a signal is received indicating that said communication queue is filled to a threshold capacity; and
   generating a second handshake signal to said first finite state machine upon reception of said Transaction Complete signal.

25. A method as defined in claim 24, further comprising the step of comparing in the write side clock domain the number of Request signals to the number of Transaction Complete signals received in said write side clock domain to obtain a difference and generating a Block Complete signal when said difference is zero.

26. A method as defined in claim 24, further comprising the step of monitoring a number of Transaction Complete signals received in said write side clock domain, comparing that number in the read side clock domain to a number of Transaction Complete signals generated in said read side clock domain to obtain a difference, and preventing the register file from being read if said difference has a predetermined value compared to a second threshold.

27. A method as defined in claim 26, wherein said Transaction Complete signal monitoring step comprises the steps of:
   incrementing a first completion pointer value on said read side clock domain, on receipt of each Transaction Complete signals;
   resynchronizing an output of said first completion pointer value to said write side clock domain;
   holding a second completion pointer value on said write side clock domain representing a count of increments of said first completion pointer value received from said write side clock domain;
   resynchronizing an output of said second completion pointer value to said read side clock domain;
   obtaining a difference in said read side clock domain between said first completion pointer value and the resynchronized second completion pointer value; and comparing said difference to said second threshold, and if said difference has a predetermined value compared to said second threshold, generating said signal to prevent said read pointer from being incremented.

28. A method as defined in claim 24, wherein said first handshake generating signal step comprises the step of generating said first handshake signal immediately after receipt of each Request signal until said signal is received indicating that said communication queue is filled to said threshold capacity.

29. A method as defined in claim 28, wherein said communication queue comprises a register file; and wherein said first handshake signal generating step comprises the steps of:
incrementing a write pointer upon receipt of said Request signal in accordance with said write side clock to determine which location in said register file in which to store received information;
incrementing a read pointer upon receipt of a Read Pending signal in accordance with said read side clock to determine from which location in said register file to read information; and
determining if said register file is at a threshold capacity based on outputs from said write pointer and said read pointer and preventing further loading of information by said register file, if said register file is determined to be at said threshold capacity.

30. A method as defined in claim 29, wherein said threshold capacity determining step comprises the steps of:
resynchronizing an output from said read pointer in accordance with said write side clock;
determining a difference in said write side clock domain between the resynchronized read pointer output and the write pointer output; and
generating a signal to prevent loading of information in said register file if said difference has a predetermined value compared to a threshold value.

31. A method as defined in claim 30, wherein said first handshake signal generating step comprises the step of reading in accordance with said read side clock domain said register file at a location pointed to by said read pointer if an output from said write pointer is indicative that there is information to be read in said register file.

32. A method as defined in claim 31, wherein said reading step includes the steps of:
resynchronizing the output from said write pointer to said read side clock domain; and
comparing in said read side clock domain the resynchronized output from said write pointer to the output from said read pointer and generating a signal to cause said register to be read if there is a difference in values.

33. A method as defined in claim 32, further comprising the step of monitoring a number of Transaction Complete signals received in said write side clock domain, comparing that number in the read side clock domain to a number of Transaction Complete signals generated in said read side clock domain to obtain a difference, and preventing the register file from being read if said difference has a predetermined value compared to a second threshold.

34. A method as defined in claim 33, wherein said Transaction Complete signal monitoring step comprises the steps of:
incrementing a first completion pointer value on said read side clock domain, on receipt of each Transaction Complete signal;
resynchronizing an output of said first completion pointer value to said write side clock domain;
holding a second completion pointer value on said write side clock domain representing a count of increments of said first completion pointer value received from said write side clock domain;
resynchronizing an output of said second completion pointer value to said read side clock domain;
obtaining a difference in said read side clock domain between said first completion pointer value and the resynchronized second completion pointer value; and
comparing said difference to said second threshold, and if said difference has a predetermined value compared to said second threshold, generating said signal to prevent said read pointer from being incremented.

* * * * *